United States Patent
Kao (10) Patent No.: US 6,779,428 B2
(45) Date of Patent: Aug. 24, 2004

(54) ADJUSTMENT DEVICE FOR A COMPOUND MITER SAW

(75) Inventor: Mei-Lan Kao, Taichung Hsien (TW)

(73) Assignee: P & F Brother Industrial Corporation, Taichung (TW)

( * ) Notice: Subject to any disclaimer, the term of this patent is extended or adjusted under 35 U.S.C. 154(b) by 0 days.

(21) Appl. No.: 10/414,037

(22) Filed: Apr. 16, 2003

(65) Prior Publication Data

US 2004/0060412 A1 Apr. 1, 2004

(30) Foreign Application Priority Data

Sep. 26, 2002 (TW) .................................. 091215197 A (51) Int. Cl.$^7$ .................................................. B26D 1/14
(52) U.S. Cl. ..................... 83/469; 83/471.3; 83/473; 83/581; 83/490
(58) Field of Search ............................... 83/581, 471.3, 83/468.7, 490, 473, 477.1, 698.51, 767, 469

(56) References Cited

U.S. PATENT DOCUMENTS

| | | | | |
|---|---|---|---|---|
| 4,011,782 A | * | 3/1977 | Clark et al. ................. 83/471.3 |
| 5,249,496 A | * | 10/1993 | Hirsch et al. ............... 83/471.3 |
| 5,819,624 A | * | 10/1998 | Brault et al. ................ 83/471.3 |
| 5,870,939 A | * | 2/1999 | Matsubara ................. 83/471.3 |
| 6,474,206 B1 | * | 11/2002 | Brunson .................... 83/471.3 |
| 6,474,207 B1 | * | 11/2002 | Itzov ......................... 83/471.3 |
| 6,595,095 B2 | * | 7/2003 | Chen .......................... 83/473 |
| 6,658,977 B2 | * | 12/2003 | Chang ......................... 83/490 |

* cited by examiner

Primary Examiner—Kenneth E. Peterson
Assistant Examiner—Omar Flores Sánchez
(74) Attorney, Agent, or Firm—Rosenberg, Klein & Lee (57) ABSTRACT

An adjustment device for a compound miter saw includes a base having a top and a miter lip with detents, a turntable having a bottom and a miter assembly. The turntable is rotatably mounted on the top of the base, and the miter assembly is attached to the bottom of the turntable. The miter assembly includes a resilient biasing member having an engaging stop corresponding to the detents, a releasing rod rotatably mounted in the turntable, and an eccentric rotator having an eccentric portion and attached to the releasing rod corresponding to the resilient biasing member. The releasing rod rotates the eccentric rotator so the eccentric portion will push the engaging stop upward to disengage it from the detents to allow the turntable to be adjusted.

8 Claims, 7 Drawing Sheets

ADJUSTMENT DEVICE FOR A COMPOUND MITER SAW

BACKGROUND OF THE INVENTION

1. Field of the Invention

The present invention relates to an adjustment device for a compound miter saw, and more particularly to an adjustment device to efficiently position the compound miter saw to cut an angle in a workpiece.

2. Description of Related Art

Compound miter saws are used to cut a piece of metal, wood or other material at a precise angle. Many applications require that a piece have an angled end, called a chamfer. Compound miter saws today have an adjustment device to adjust the saws to cut a piece at a specific angle.

Figure 7:
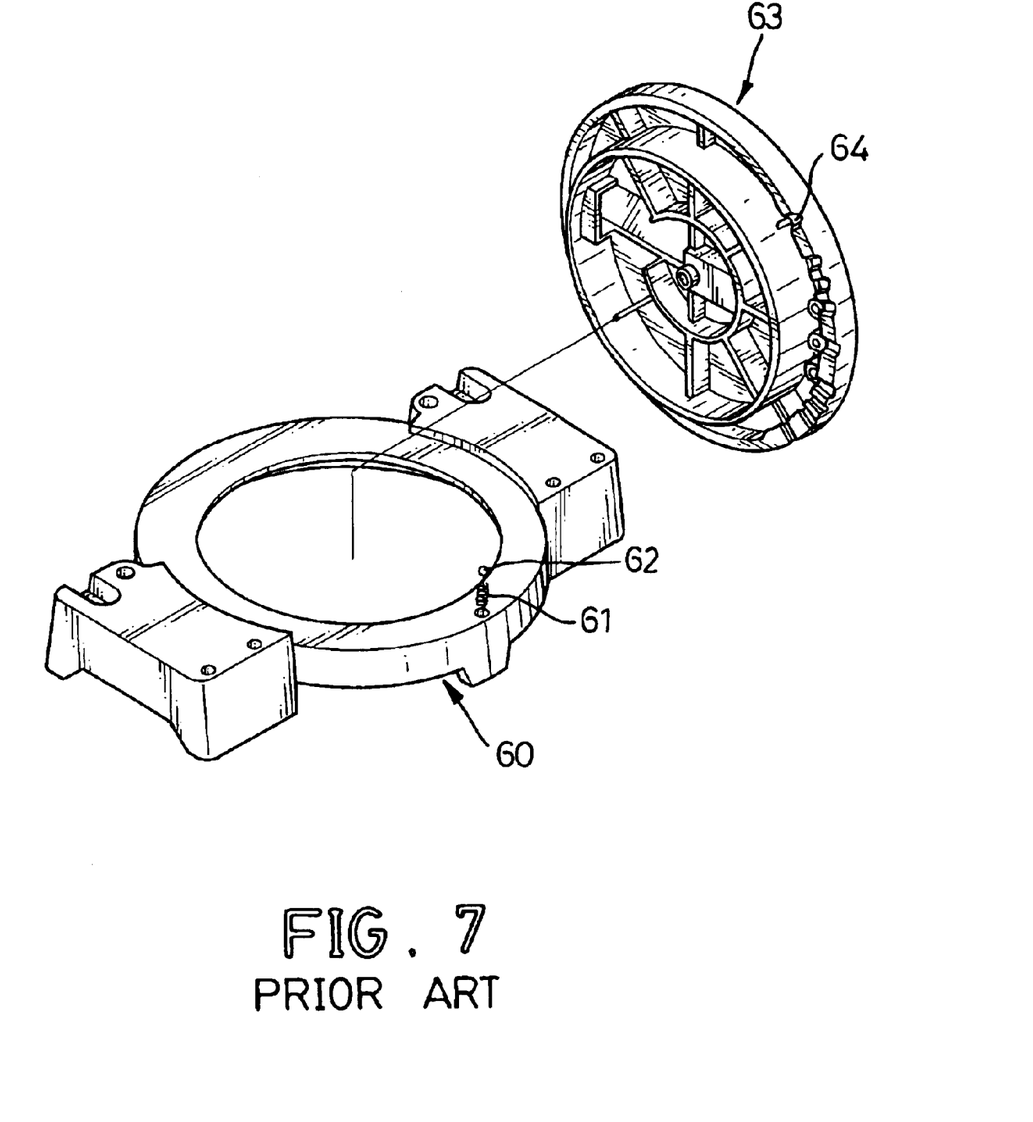
FIG. 7 is a perspective view of a conventional adjustment device for a compound miter saw in accordance with the prior art.

With reference to FIG. 7, a conventional adjustment device (not numbered) for a compound miter saw (not shown) comprises a base (60), and a turning disk (63). The base (60) has a spring (61) and ball (62) combination, a top (not numbered), a center (not numbered), a central opening (not numbered) and a spring-ball hole (not numbered). The central opening is defined through the top at the center of the base (60). The spring-ball hole is defined in the top of the base (60) adjacent to the central opening.

The turning disk (63) is rotatably mounted in the central opening on the top of the base (60). The turning disk (63) has a top (not numbered), a bottom (not numbered), an annular lip (not numbered) and detents (64). The top of the turning disk (63) is adapted to support a piece (not shown) to be cut where a cutting mechanism (not shown) cuts the piece. The annular lip is formed at the bottom of the turning disk (63) and corresponds to the central opening in the base (60). The annular lip is rotatably held in the central opening in the base (60) so the turning disk (63) will rotate on the base (60).

The detents (64) are V-shaped and are formed on the bottom of the turning disk (63) corresponding to the spring-ball hole in the base (60). The spring (61) and the ball (62) are mounted in the spring-ball hole in the base (60) so the ball (62) partially extends from the spring-ball hole to selectively engage one of the detents (64).

The turning disk (63) is rotatably attached to the top of the base (60), and the bottom of the turning disk (63) presses against the ball (62) and compresses the spring (61) in the spring-ball hole. The compression of the spring (61) will create a restitution force that pushes the ball (62) upward to engage one of the detents (64) to hold the turning disk (63) in place.

However, the conventional adjustment device for a compound miter saw that uses the restitution force of the spring (61) to push the ball (62) into a detent (64) may easily slip from the desired position. When the turning disk (63) is subjected to an inadvertent impact, the spring (61) may be compressed and the ball (62) may slip from the V-shaped detent (64) that allows the turning disk (63) to rotate. So, the turning disk (63) cannot be efficiently locked and precisely held at all times.

Although the adjustment device has been modified to increase the restitution force of the spring (61) to improve the connection between the ball (62) and the detents (64), the increased restitution force of the spring (61) will cause rotating the turning disk (63) more difficult. The modified adjustment device is inconvenient to operate.

To overcome the shortcomings, the present invention provides an adjustment device for a compound miter saw to mitigate or obviate the aforementioned problems.

SUMMARY OF THE INVENTION

The main objective of the invention is to provide the ability to precisely position and firmly hold a miter saw turntable so the compound miter saw can cut a precise, desired angle.

Another objective of the invention is to provide the ability to lock the turntable of the miter saw after the turntable has been adjusted to a desired position.

Other objectives, advantages and novel features of the invention will become more apparent from the following detailed description when taken in conjunction with the accompanying drawings.

DETAILED DESCRIPTION OF PREFERRED EMBODIMENT

Figure 1:
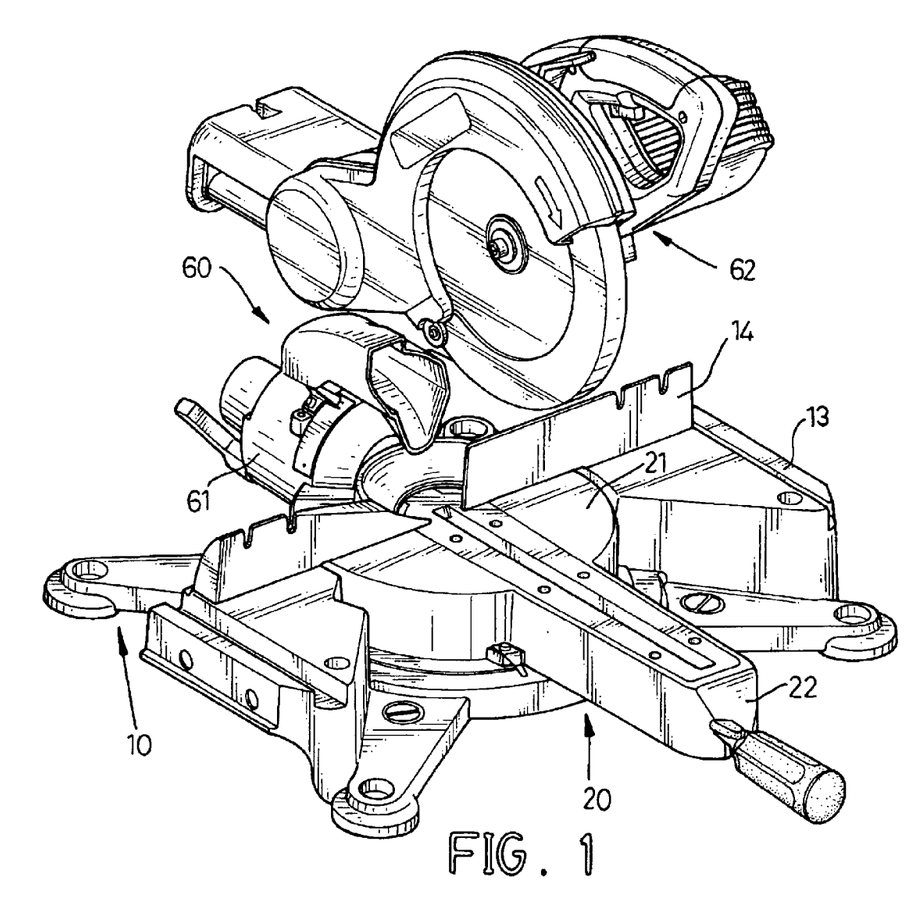
FIG. 1 is a perspective view of a compound miter saw with an adjustment device for miter cutting in accordance with the present invention.

With reference to FIG. 1, a compound miter saw comprises a base (10), a turntable (20), a saw assembly (60), two supports (13) and a fence (14). The turntable (20) is rotatably mounted on the base (10). The saw assembly (60) is attached to the turntable (20) and comprises a connecting assembly (61) and a power saw assembly (62). The connecting assembly (61) is attached to the turntable (20) and the power saw assembly (62) is pivotally attached to the connecting assembly (61). The power saw assembly (62) can be pivoted toward the turntable (20) to cut a piece (not shown). The supports (13) have a top surface (not numbered) for supporting a piece (not shown) to be cut and are attached respectively to opposite sides of the base (10). The fence (14) is two pieces (not numbered) that have aligned front flat surfaces (not numbered) and are attached respectively to the top surface of each support (13). A piece to be cut abuts the front flat surfaces and is held in position by the fence (14) when the saw assembly (60) cuts the piece.

Figure 2:
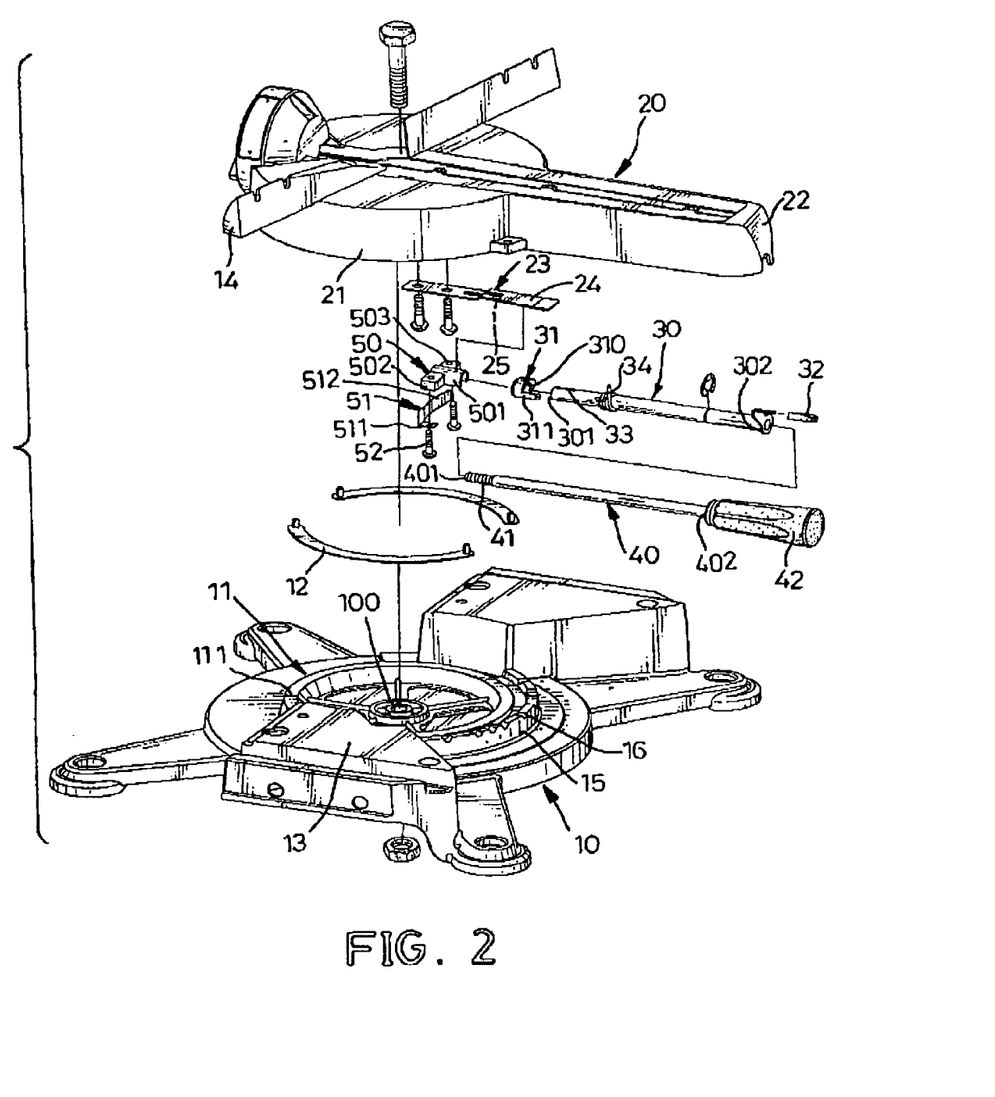
FIG. 2 is an exploded, perspective view of the adjustment device in FIG. 1.
Figure 3:
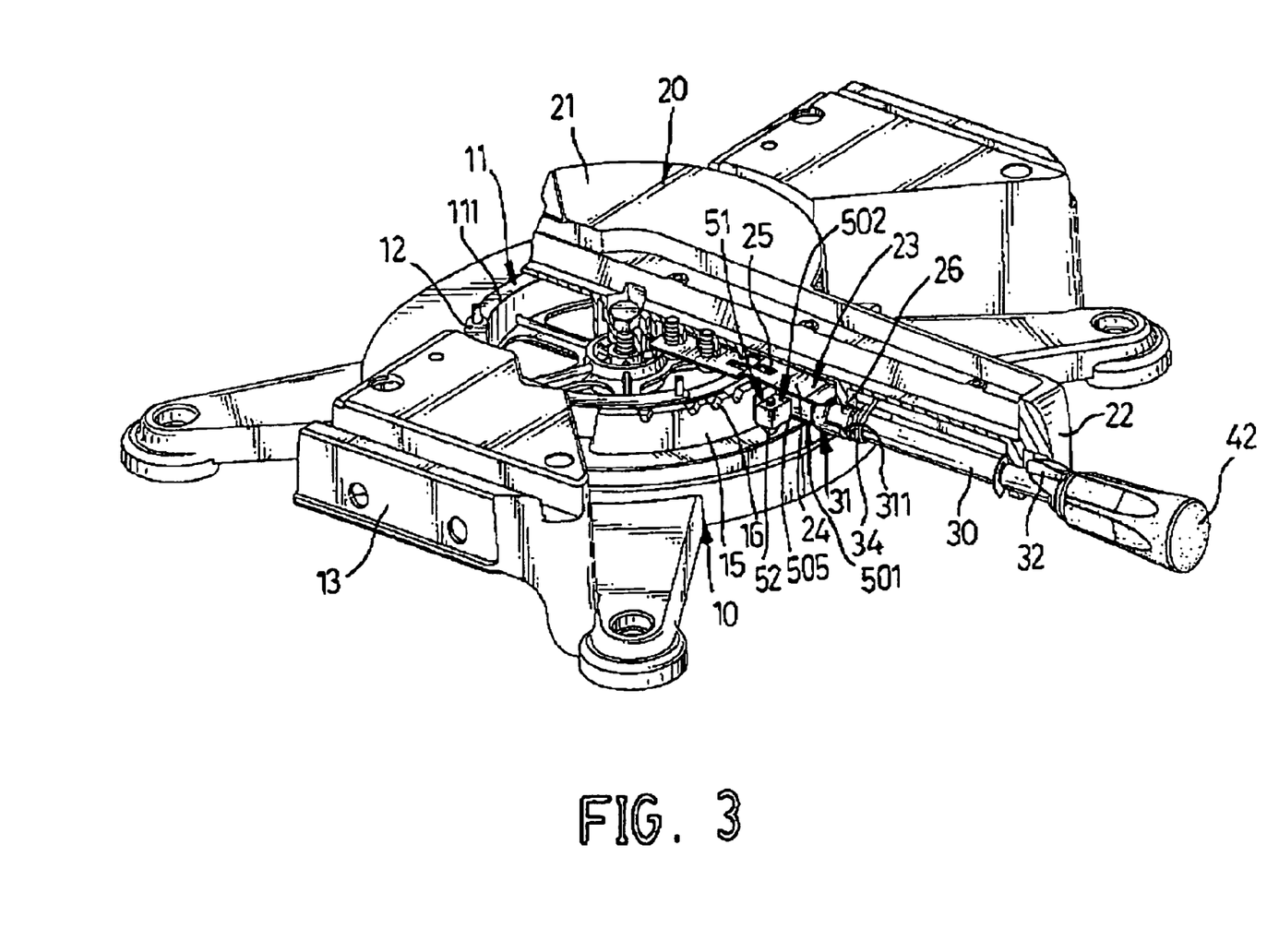
FIG. 3 is a perspective view in partial section of the adjustment device in FIG. 2.

With reference to FIGS. 2 and 3, an adjustment device for a compound miter saw comprises a base (10), a turntable (20), two sliding guides (12), a miter assembly (not numbered), and a locking assembly (not numbered). The base (10) has a center (not numbered), a top (not numbered), a front (not numbered), a rear (not numbered), two opposite sides (not numbered), a through hole (100), an annular lip (11) and a miter lip (15).

The annular lip (11) is formed around the center of the base (10), protrudes from the top of the base (10) and has a top edge (111). The through hole (100) is defined through the center of the base (10). The miter lip (15) is curved and is formed on the top of the base (10) between the annular lip (11) and the front of the base (10). The miter lip (15) has a top edge (not numbered), an outer periphery (not numbered) and multiple miter detents (16). The multiple miter detents (16) are formed in the top edge of the miter lip (15) at specific angles from the center of the base (10).

The turntable (20) has a top (not numbered), a bottom (not numbered), a turning disk (21) and an elongated cutting guide (22). The turning disk (21) has a top (not numbered), a bottom (not numbered), a center (not numbered) and an attachment hole (not numbered) and is rotatably attached to the base (10) by a fastener mounted through the attachment hole in the turning disk (21) and the through hole (100) in the base (10). The cutting guide (22) has a top (not numbered), a bottom (not numbered), a front (not numbered), a roar (not numbered) and a rotator stop (26) and extends radially from the turning disk (21). The rotator stop (26) is formed on the bottom of the cutting guide (22). The top of the cutting guide (22) is level with the top of the turning disk (21). The turntable (20) is rotatably mounted on the top of the base (10) by a fastener, such as a nut (not numbered) and a bolt (not numbered), around the annular lip (11) and the miter lip (15). The two sliding guides (12) are mounted respectively on the top edge (111) of the annular lip (11). The sliding guides (12) allow the turntable (20) to easily slide on the top of the base (10). The turntable (20) can be turned or rotated to a given angular position relative to the base (10).

The miter assembly is mounted on the bottom of the turntable (20) and comprises a resilient biasing member (23), a releasing rod (30), an eccentric rotator (31), a tag (32) and a coil spring (34). The resilient biasing member (23) has a fixed end (not numbered), a free end (24) and an engaging stop (25). The fixed end of the resilient biasing member (23) is attached to the bottom of the turning disk (21) by fasteners, such as bolts. The free end (24) of the resilient biasing member (23) faces the front of the base (10) and extends down toward the miter lip (15). The engaging stop (25) is formed between the two ends of the resilient biasing member (23) and corresponds to the detents (16) in the miter lip (15). The engaging stop (25) selectively engages one detent (16) at a time.

The releasing rod (30), is hollow, is rotatably mounted in the bottom of the turntable (20) corresponding to the resilient biasing member (23). The releasing rod (30) has an inside end (301) with a keyway (33) and an outside end (302) that extends out of the front of the cutting guide (22). The tag (32) is attached to the outside end (302) of the releasing rod (30) to rotate the releasing rod (30).

Figure 4:
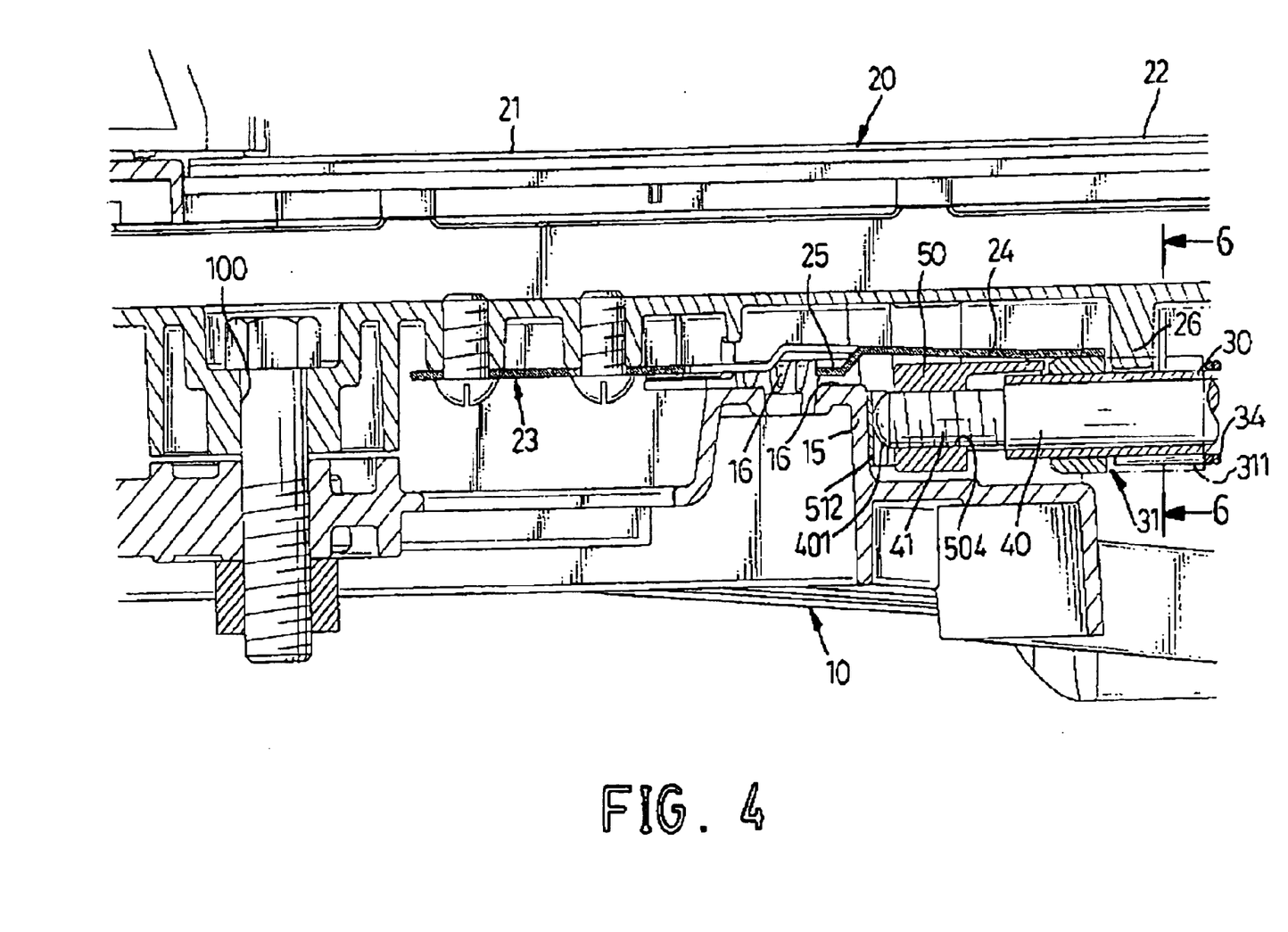
FIG. 4 is an enlarged side plan view in partial section of the adjustment device in FIG. 2 when the turntable is locked.
Figure 6:
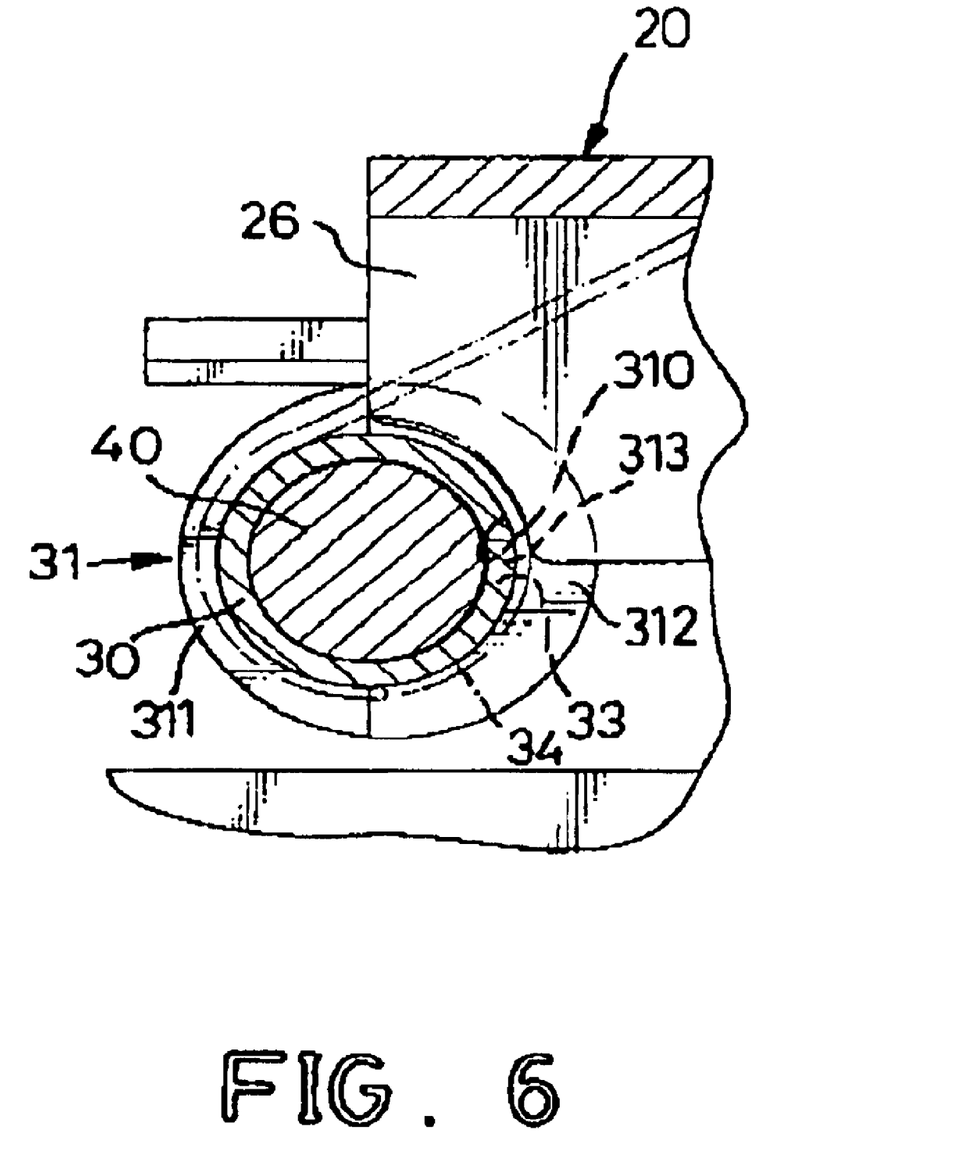
FIG. 6 is an enlarged front plan view of the adjustment device along line 6—6 in FIG. 4.

With further reference to FIGS. 4 and 6, the eccentric rotator (31) is attached to the inside end (301) of the releasing rod (30), aligns with the free end (24) of the resilient biasing member (23) and has an axial hole (310), a limiting arm (311) and an eccentric portion (312). The axial hole (310) has a key (313) corresponding to the keyway (33) and is defined axially in the eccentric rotator (31). The inside end (301) of the releasing rod (30) passes through and is held in the axial hole (310), end the key (313) is mounted in the keyway (33). The limiting arm (311) is formed on the eccentric rotator (31), extends toward the front of the cutting guide (22) and corresponds to and selectively abuts the rotator stop (26). The eccentric portion (312) is offset from the axial hole (310) and is formed apposite to the limiting arm (311). The eccentric portion (312) will touch the free end (24) of the resilient biasing member (23) to push the free end (24) upward when the eccentric rotator (31) is rotated thereby releasing the engaging stop (25) from the detents (16) in the miter lip (15). The coil spring (34) is mounted around the releasing rod (30) and has a first end (not numbered) and a second end (not numbered). The first end of the coil spring (34) abuts against the limiting arm (331), and the second end of the coil spring (34) abuts against the bottom of the turntable (20). When the limiting arm (331) is rotated by the releasing rod (30), the coil spring (34) will be compressed to create a restitution force. The restitution force provided by the coil spring (34) will automatically return the limiting arm (311) when the releasing rod (30) is released.

The locking assembly is attached to the bottom of the turntable (20) and has a holder (50), a resilient biasing brake (51), a locking rod (40) and a handle (42). The holder (50) is attached to the bottom of the turning disk (21) adjacent to the outer periphery of the miter lip (15). The holder (50) has a hollow cylinder (501) and two mounting feet (502). The hollow cylinder (501) has an internal thread (504) and two opposite sides (505). Each mounting foot (502) having a mounting hole (503) is formed beside the hollow cylinder (501) to be attached to the bottom of the turning disk (21) by means of fasteners (52), such as bolts.

The resilient biasing brake (51) has a connecting tab (511) and an elongated portion (512) that are perpendicular to each other. The connecting tab (511) is attached to one mounting foot (502) of the holder (50). The elongated portion (512) is positioned between the outer periphery of the miter lip (15) and the hollow cylinder of the holder (50).

The locking rod (40) has an inside end (401) and an outside end (402). The inside end (401) has an external thread (41) corresponding to the internal thread (504) in the hollow cylinder (501) of the holder (50), and the outside end (402) extends out of the front of the cutting guide (22). The handle (42) is attached to the outside end (402) of the locking rod (40). The locking rod (40) is rotatably held in the hollow releasing rod (30) with the two ends (401, 402) of the locking rod (40) respectively extending out of the releasing rod (30). The inside end (401) of the locking rod (40) will retract into or extend out of the hollow cylinder (501) of the holder (50) when the locking rod (40) is turned. Therefore, the locking rod (40) is turned to axially move the inside end (401) frontward or rearward to separate from or abut the resilient biasing brake (51).

Figure 5:
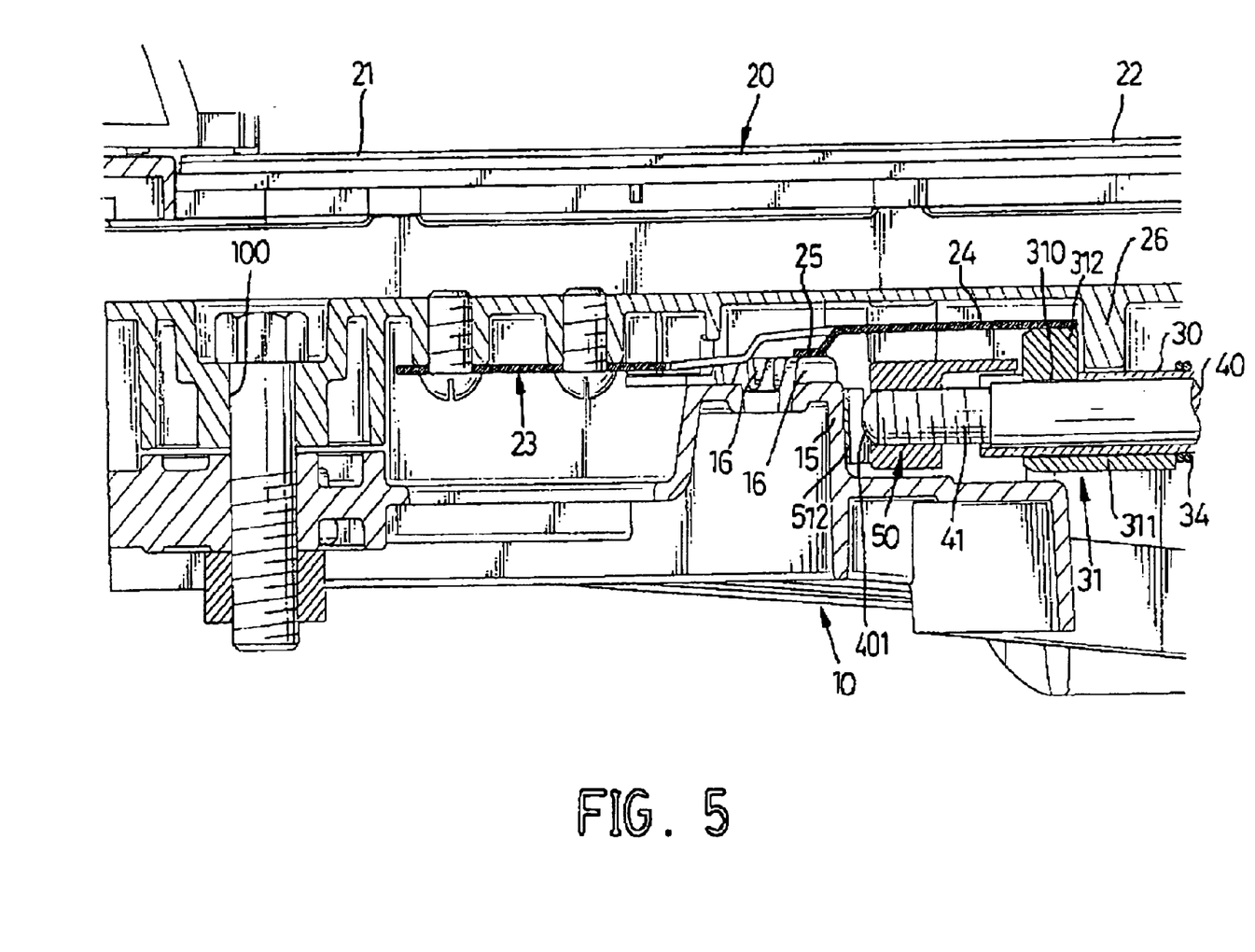
FIG. 5 is an enlarged side plan view in partial section of the adjustment device in FIG. 2 when the turntable is unlocked.

With reference to FIGS. 3, 5 and 6, the turning disk (21) is rotated relative to the base (10) by rotating the handle (42) in a counter clockwise direction to axially move the locking rod (40) frontward. The movement of the locking rod (40) moves the inside end (401) of the locking rod (40) away from the miter lip (15). Turning the tag (32) in a counter clockwise direction will rotate the eccentric rotator (31) until the limiting arm (311) in down and abuts the rotator stop (26). At the same time, the limiting arm (311) compresses the coil spring (34) to create a restitution force. Because the eccentric portion (312) of the rotator (31) is opposite to the limiting protrusion (311), the eccentric portion (312) will be up and push the free end (24) of the resilient biasing member (23) upward. The upward movement of the free end (24) of the resilient biasing member (23) will lift and disengage the engaging stop (25) from the detent (16) in the miter lip (15). Thereafter, the turning disk (21) can be rotated to a proper angle to make a desired cut.

With reference to FIGS. 3, 4 and 6, the turning disk (21) is locked at a given angle by turning the releasing rod (30) in a clockwise direction to rotate the eccentric rotator (31). The restitution force provided by the coil spring (34) will act on the limiting arm (311) to rotate the eccentric rotator (31) in the clockwise direction. The limiting arm (311) is up and abuts the rotator stop (26) on the bottom of the cutting guide (22). At this time, the eccentric portion (312) of the eccentric rotator (31) is down relative to the free end (24) of the resilient biasing member (23). The free end (24) of the resilient biasing member (23) is also down without any support. So, the engaging stop (25) will engage one detent (16) to position the turning disk (21). Rotating the handle (42) in a clockwise direction will rotate the locking rod (40) to axially move the inside end (401) rearward. The inside end (401) of the locking rod (40) will abut the elongated portion (512) of the resilient biasing brake (51), and the resilient biasing brake (51) will abut the miter lip (15) to firmly lock the turning disk (21) by friction.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustment device for a compound miter saw, and the adjustment device comprising:
   a base with a top, a front, a rear, a center and two opposite sides having
      a central through hole defined through the top at the center of the base; and
      a curved miter lip radially formed on the top of the base between the center and the front of the base and having a top edge, an outer periphery and multiple detents respectively defined on the top edge of the miter lip;
   a turntable with a bottom rotatably mounted on the top of the base by means of a fastener having an external threaded end passing through and extending out of the central through hole in the base onto which a nut is screwed and the turntable having
      a turning disk rotatably mounted on the top of the base and having a top, a bottom, a front and a rear; and
      a cutting guide protruded from the front of the turning disk and having a top, a bottom, a front and a rear; and
   a miter assembly mounted on the bottom of the turntable and comprising
      a resilient biasing member attached to the bottom of the turning disk corresponding to the miter lip on the base and having a fixed end, a free end and an engaging stop, the fixed end attached to the bottom of the turning disk by means of fasteners, the free end facing the front of the base, and the engaging stop formed between the two ends corresponding to the detents on the miter lip to selectively engage one of the detents;
      a releasing rod rotatably mounted in the bottom of the turntable corresponding to the resilient biasing member and having an inside end with a keyway and an outside end extending out of the front of the cutting guide;
      an eccentric rotator attached to the inside end of the releasing rod and aligned with the free end of the resilient biasing member and having an axial hole and an eccentric portion, the axial hole having a key corresponding to the keyway axially defined in the eccentric rotator, and the inside end of the releasing rod extending through the axial hole with the key fitted in the keyway, and the eccentric portion being offset with the axial hole for pushing the free end of the resilient biasing member; and
      a tag attached to the outside end of the releasing rod to rotate the releasing rod;
   whereby the engaging stop disengages from the detents that allows the turning disk to be adjusted when the free end of the resilient biasing member is pushed by the eccentric portion when the eccentric rotator is rotated.

2. The adjustment device as claimed in claim 1, wherein the releasing rod is hollow, and the adjustment device further comprises
   a locking assembly attached to the bottom of the turntable and having
      a holder mounted on the bottom of the turning disk adjacent to the outer periphery of the miter lip and having a hollow cylinder with two opposite sides and an internal thread and two mounting feet, the internal thread defined in the hollow cylinder, and one of the mounting feet formed at each side of the hollow cylinder and having a mounting hole to be attached to the bottom of the turning disk by means of fasteners;
      a resilient biasing brake secured on one mounting foot of the holder and having a connecting tab and an elongated portion that are perpendicular to each other, the connecting tab secured on one mounting foot of the holder and the elongated portion positioned between the outer periphery of the miter lip and the hollow cylinder of the holder;
      a locking rod rotatably held in the hollow releasing rod and having an inside end with an external thread corresponding to the internal thread in the hollow cylinder of the holder and an outside end extending out of the front of the cutting guide, where the external thread in the inside end of the locking rod screws into the internal thread in the hollow cylinder of the holder so the inside end of the locking rod will be retractable when the locking rod is rotated; and
      a handle attached to the outside end of the locking rod to rotate the locking rod.

3. The adjustment device as claimed in claim 1, wherein the eccentric rotator further has a limiting arm formed on the eccentric rotator opposite to the eccentric portion; and
   a rotator stop is formed on the bottom of the cutting guide corresponding to the limiting arm of the eccentric rotator to abut the limiting arm.

4. The adjustment device as claimed in claim 2, wherein the eccentric rotator further has a limiting arm formed on the eccentric rotor opposite to the eccentric portion; and
   a rotator stop is formed on the bottom of the cutting guide corresponding to the limiting arm of the eccentric rotator to abut the limiting arm.

5. The adjustment device as claimed in claim 1, wherein the adjustment device further comprises two sliding guides slidably mounted between the turning disk and the base,
   the base further has an annular lip protruded from the top of the base, the annular lip having a top edge to slidably support the sliding guides on which, and
   the miter lip is formed on the top of the base between the annular lip and the front of the base;
   wherein the turntable is rotatably mounted on the top of the base with the annular lip and the two sliding guides that aids the turntable to easily slide on the top of the base.

6. The adjustment device as claimed in claim 3, wherein the adjustment device further comprises two sliding guides slidably mounted between the turning disk and the base, the base further has an annular lip protruded from the top of the base, the annular lip having a top edge to slidably support the sliding guides on which, and the miter lip is formed on the top of the base between the annular lip and the front of the base;

wherein the turntable is rotatably mounted on the top of the base with the annular lip and the two sliding guides that aids the turntable to easily slide on the top of the base.

7. The adjustment device as claimed in claim 4, wherein the adjustment device further comprises two sliding guides slidably mounted between the turning disk and the base, the base further has an annular lip protruded from the top of the base, the annular lip having a top edge to slidably support the sliding guides on which, and the miter lip is formed on the top of the base between the annular lip and the front of the base;

wherein the turntable is rotatably mounted on the top of the base with the annular lip and the two sliding guides that aids the turntable to easily slide on the top of the base.

8. The adjustment device as claimed in claim 7 further comprising a coil spring mounted around the releasing rod and having a first end and a second end, the first end of the coil spring abutting against the limiting arm and the second end of the coil spring abutting against the bottom of the turntable to provide a restitution force returning the limiting arm.

* * * * *